United States Patent
Birnbaum et al.

(10) Patent No.: US 7,096,641 B2
(45) Date of Patent: Aug. 29, 2006

(54) HOLLOW PROFILE

(75) Inventors: Ulrich Birnbaum, Penzing (DE); Stefan Unverzagt, Penzing (DE); Adrian Steingruber, Graben (DE)

(73) Assignee: Hilti Aktiengesellschaft, Schaan (LI)

( * ) Notice: Subject to any disclaimer, the term of this patent is extended or adjusted under 35 U.S.C. 154(b) by 177 days.

(21) Appl. No.: 10/768,774

(22) Filed: Jan. 30, 2004

(65) Prior Publication Data

US 2004/0237280 A1 Dec. 2, 2004

(30) Foreign Application Priority Data

May 19, 2003 (DE) ............... 103 22 755

(51) Int. Cl.
*E04C 3/32* (2006.01)
(52) U.S. Cl. ............... 52/733.2; 52/731.5; 52/731.9; 428/603; 428/599; 428/596; 428/595
(58) Field of Classification Search ............ None
See application file for complete search history.

(56) References Cited

U.S. PATENT DOCUMENTS

| | | | |
|---|---|---|---|
| 3,224,154 A | 12/1965 | Toti et al. | |
| 4,069,638 A | 1/1978 | Hasselquist et al. | |
| 5,927,041 A | 7/1999 | Sedlmeier et al. | |
| 6,660,938 B1 * | 12/2003 | Herb et al. | 174/68.1 |
| 2003/0042033 A1 | 3/2003 | Herb et al. | |
| 2003/0159397 A1 | 8/2003 | Birnbaum | |
| 2004/0094681 A1 * | 5/2004 | Birnbaum | 248/300 |

FOREIGN PATENT DOCUMENTS

| | | |
|---|---|---|
| DE | 3513382 | 10/1986 |
| DE | 19740101 | 3/1999 |
| DE | 29923482 | 11/2000 |
| EP | 0906737 | 4/1999 |
| EP | 1288387 A1 * | 3/2003 |
| FR | 2258502 | 8/1975 |
| GB | 1605408 | 6/1996 |

* cited by examiner

*Primary Examiner*—John J. Zimmerman
(74) *Attorney, Agent, or Firm*—Abelman, Frayne & Schwab

(57) ABSTRACT

A hollow profile (1) formed of a flat material (31) having a width (d) has at least one groove (6.1, 6.2, 7.1, 7.2) provided on an outer side of at least one of the plurality of walls (2.1, 2.2, 5.1, 5.2) of the profile (1) and having a bottom (8.1, 8.2, 9.1, 9.2) spaced form the outer side by depth (t) and two opposite, substantially flat side walls (13.1, 13.2, 40.1, 40.2) extending substantially perpendicular to the bottom (8.1, 8.2, 9.1, 9.2), with the groove depth (t) of the at least one groove (6.1, 6.2, 7.1, 7.2, 32) amounting to from 0.5 to 2 times of the material thickness (d) of the flat material (31).

7 Claims, 3 Drawing Sheets

HOLLOW PROFILE

BACKGROUND OF THE INVENTION

1. Field of the Invention

The present invention relates to a hollow profile formed of a flat material and having a plurality of side walls and at least one groove provided on an outer side of at least one of the plurality of side walls and having a bottom spaced form the outer side by a predetermined depth and two opposite side walls.

The present invention also relates to a method of forming the hollow profile.

2. Description of the Prior Art

Generally, a hollow profile, which is formed of a flat material, is characterized by a small weight while having good static characteristics. For positioning and guiding of connection, parts, e.g., add-on parts, a hollow profile of an assembly system is provided with grooves in which the connection parts are guided. With add-on components being mounted on a hollow profile, often, torsional loads act on the hollow profile. Therefore, from a static point of view, a circumferentially closed hollow profile is preferred. However, the greater is the depth of the groove the smaller is the torsional load a hollow profile can withstand. Therefore, it is desirable to have the groove depth as small as possible.

As a rule, the size of the inner bending radius of a sheet, which is bent to 90°, corresponds to the thickness of the sheet. The drawback of this general rule consists in that with a small groove depths, which are accompanied by small bending radii, it is impossible to obtain side walls of a groove which would extend perpendicular to the groove bottom or to the outer side of a profile. The use of a narrow bending radius corresponding to the thickness of a flat material is accompanied by upsetting of the flat material on the inner side of a bent and by stretching of the flat material on the outer side of the bent. This leads to formation of fissures and/or reduction of the material strength.

It is known to form notches before bending at the position of the inner radius of a material. The formation of notches permits to use radii as small as the thickness of the flat material. However, this results in reduction of the cross-section of the material and, consequently, in reduction of the material strength.

Up to the present, with grooves having a small radius, this problem was bypassed by forming a groove with side walls extending to the groove bottom at angle different from 90°, e.g., at an angle of 45°. If a connection part with rectangular bearing surfaces is loaded sidewise, with such a groove, its guidance in the longitudinal direction of a profile and the prevention of the part from rotation is not insured. When the bearing surface of a connection part is complementary to the shape of a groove, with a side load acting on the connection part, a force component would be produced that would extend at an angle to the direction of force acting on the connection part and that could lift the connection part out of the groove.

Accordingly, an object of the present invention is to provide a hollow profile from a flat material with a groove having a small depth and which would insure an adequate longitudinal and lateral guidance for a connection part, whereby the absorption of the torsional stresses would be insured.

Another object of the present invention is to provide a hollow profile that can be produced simply and economically.

SUMMARY OF THE INVENTION

These and other objects of the present invention, which will become apparent hereinafter, are achieved by providing a hollow profile of the type described above and in which the groove depth amounts to from 0.5 to 2 times of the material thickness of the flat material, insuring that the side walls would extend substantially perpendicular to the groove bottom and would be substantially flat.

With a groove according to the invention, the static characteristic of a hollow profile made of a flat material are maintained to a most possible extent, and a reliable longitudinal and lateral guidance of a connection or add-on part along the hollow profile is insured. With a connection part having a shape corresponding to the groove cross-section, the connection part neither rotates nor is displaced sidewise, i.e., in a direction transverse to the longitudinal axis of the profile in its mounted condition on the profile. With the groove bottom being substantially flat, a flat contact between a connection part and a profile is insured, and the opposite side walls, which extend to the bottom at an angle slightly less than 90°, are capable to absorb acting, on the connection part, forces despite a small depth of the groove. Further, the connection part cannot be lifted off the groove despite side forces acting on the connection part.

Additionally, e.g., a slide bearing, e.g., of polyethylene can be arranged in the groove. Such a bearing can be provided, e.g., upon an arrangement of a part on the hollow profile. The bearing can be displaceable in the longitudinal direction in order to absorb stresses generated in the part. Such part can represent a support or a conducting part such as a tubular conduit or a ventilation channel.

Preferably, the groove depth of the at least one groove amounts to less than 1.5 times of the material thickness of the flat material. With these groove depths, the static characteristics of the hollow profile are maintained to a most possible extent, while a predetermined guidance of a connection part on the hollow profile is insured.

Advantageously, at least one groove is provided on each of the walls of a hollow profile. On a wall of a hollow profile, several grooves can be formed next to each other. Preferably, all of the grooves have the same profile, i.e., the same depth and the same width. With an inventive hollow profile designed for use in an assembly system, with grooves having the same profile or shape, a greater flexibility in the use of the hollow profile is obtained.

The bottom of the at least one groove extends preferably parallel to a corresponding axis of the hollow profile. With a rectangular hollow profile having four side walls with a groove formed in each of the side walls the grooves bottom extend parallel to respective axes of the hollow profile. The grooves extend, preferably, along the entire length of the profile parallel to respective axes.

Advantageously, at least one mounting opening is formed in the bottom of the at least one groove. The mounting opening(s) is (are) designed for receiving fastening means for securing a connection element on the hollow profile. The mounting opening advantageously is adapted to the type of the fastening means, and the opening can have, e.g., a round or rectangular cross-section.

Preferably, the flat material for forming the inventive hollow profile is a sheet metal that, preferably, is subjected to a rolling and bending process in order to obtain the profile. Flat material in form of sheet metal is treated easily and economically. By using a rolling/bending process, a plurality of different profiles can be formed.

In addition to the rolling/bending process, other processes, e.g., a stamping/bending process, can be used.

A method of forming an inventive hollow profile formed of a flat material and including a least one groove provided on an outer side of at least one wall of the hollow profile and having a bottom spaced from the outer side by depth and two opposite side walls, includes the steps of:

forming a groove with a depth greater than a predetermined end depth of the at least one groove;

pressing a bottom of the groove with the greater depth in a direction opposite a direction of formation of the groove with the greater depth until the predetermined end depth of the at least one groove is substantially reached, with formation, as a result of a groove having a dovetail cross-section;

pressing a projecting material of the dovetail groove backward, and bending the flat material to a desired shape of the profile.

Because the groove depth obtained in the first step is greater than the predetermined end depth of the at least one groove, the inner bending radius can correspond to the thickness of the flat material. Therefore, the material strength of the flat material in the bending region is reduced only slightly. Then, the groove bottom is pressed in a direction opposite the groove formation direction until the predetermined depth is reached. With this step, a dovetail cross-section is formed in the groove. The width of the groove in the plane of a respective side wall of the groove is smaller than the predetermined width of the finished groove. The projecting, in the cross-section, material is then pressed sidewise backward, and after this step, the groove has a desired width. Upon pressing back the projecting material, the material can flow in a free space in the region of the inner radius. As a result of flow of the material, statically favorable material strength and material accumulation are obtained in regions that are subjected, under load, to greatest negative stresses. Finally, the flat material is bent to a predetermined profile. Preferably, the operational steps for forming a groove are parts of a rolling process.

The loading of the material takes place not by superimposition of stresses in the main bending region, but is rather displaced to the side walls. There, the stresses can be distributed relatively free, so that the material would not be damaged in this region. Besides, despite the small groove depth, the side groove walls, which have substantially the same width and height and serve as longitudinal and lateral guides for a connection part the shape of which is matched to that of the groove, extend perpendicular to the groove bottom.

Preferably after pressing backward the projecting, in the cross-section of the groove, material, in a further step, the groove bottom is straightened. Dependent on the construction of the device for forming the groove, during different operational steps, large deviations of the groove dimensions, which lie outside of predetermined tolerances, takes place. With straightening of the groove bottom, the tolerances are limited to acceptable values. According to an alternative method of forming the groove, the groove is supported, during the backward pressing of the projecting material, sidewise and beneath, e.g., by rolls or other supports, which permits to eliminate the secondary straightening of the groove bottom.

Advantageously, the method includes the step of material locking connection of the free longitudinal edges of the bent flat material, which finishes the formation of the inventive hollow profile. Advantageously, the longitudinal edges are connected with each other along their entire length, e.g., are butt-welded, soldered, or glued with each other.

The novel features of the present invention, which are considered as characteristics for the invention, are set forth in the appended claims. The invention itself, however both as to its construction and its mode operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
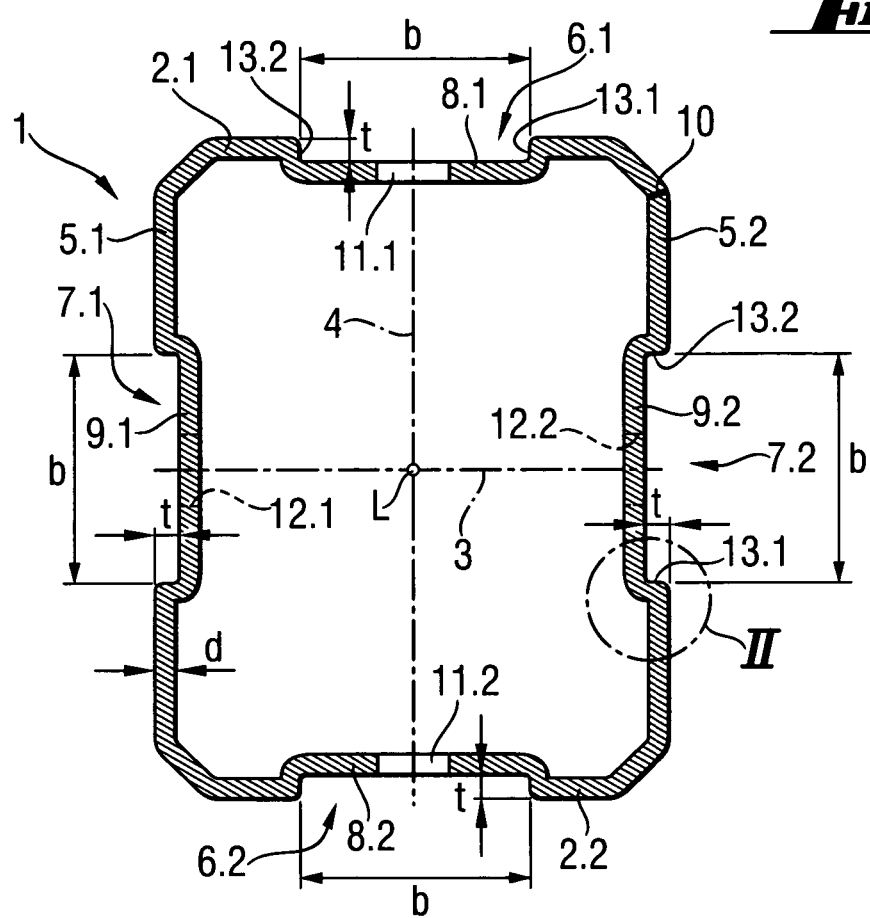
FIG. 1 a cross-sectional view of a hollow profile according to the present invention.

A hollow profile 1 according to the present invention, which is shown in FIG. 1, has a substantially rectangular cross-section, a first pair of side walls 2.1 and 2.2 which extend parallel to each other and to one of the axes 3 of the cross-section of the profile 1, and a second pair of side walls 5.1 and 5.2 which also extend parallel to each other and to another of the axes 4 of the cross-section of the profile 1. In the embodiment shown in FIG. 1, the hollow profile 1 has a smaller dimension in the direction of the axis 3 than in the direction of the axis 4. The hollow profile 1 is formed of sheet steel by rolling/bending process, and it has a uniform thickness d. The treated and profiled sheet steel has its opposite end surfaces connected by a butt-joined weld 10, forming a hollow profile 1.

On the side walls 2.1 and 2.2, there are formed, respectively, grooves 6.1 and 6.2 extending in the longitudinal direction L, and on the side walls 5.1 and 5.2, there are formed, respectively, grooves 7.1 and 7.2 likewise extending in the longitudinal direction L of the hollow profile 1. The grooves 6.1, 6.2 and 7.1, 7.2 form longitudinal and lateral guide means for shaped and connection parts matching the groove arrangement. The grooves 6.1, 6.2, 7.1, and 7.2 have all the same width b and depth t. This provides for arrangement in the grooves 6.1, 6.2, 7.1, and 7.2 of the matching connection parts along the entire longitudinal direction L of the hollow profile and in each of the side walls 2.1, 2.2, 5.1, and 5.2. The layout of grooves 6.1, 6.2, 7.1 and 7.2 permits to use a large area of the hollow profile when the hollow profile is used, e.g., as an assembly support in an assembly system. Each of the grooves 6.1, 6.2, 7.1, and 7.2 has a bottom 8.1, 8.2, 9.1, and 9.2, respectively, and a pair of side walls 13.1 and 13.2.

The bottoms 8.1 and 8.2 of the grooves 6.1 and 6.2 extend parallel to planes of respective side wall 2.1 and 2.2. The bottoms 9.1 and 9.2 of the grooves 7.1 and 7.2 extend parallel to planes of respective side walls 5.1 and 5.2. A mounting opening 11.1, 11.2, through which a fastening element can extend, is formed in a respective groove bottom 8.1, 8.2 in the region of intersection of the axis 4 with the respective bottom 8.1, 8.2. The mounting openings 11.1, 11.2 extend along the axis 4. In groove bottom 9.1 and 9.2 in the region of intersection of the axis 3 with respective bottom 9.1, 9.2, there are provided, respectively, mounting openings 12.1, 12.2 through which a fastening element can extend. The mounting openings 12.1, 12.2 extend along the axis 3.

Figure 2:
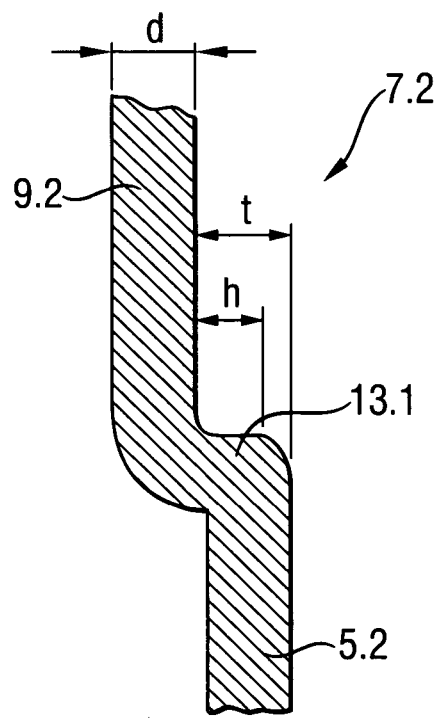
FIG. 2 a detail view of a groove at an increased, in comparison with FIG. 1 scale, shown in region II in FIG. 1.

FIG. 2 shows, at an increased scale, a detail of groove 13.1 in the region II in FIG. 1. The depth of the groove 7.2 corresponds approximately to 1.2 times of the thickness d of the sheet steel the hollow profile 1 is made of. The side wall 13.1 extends substantially perpendicular to the groove bottom 9.2 and has a flat or even section h the height of which amounts to about 70% of the depth t. A connection part, which is arrangeable in the groove 7.2, can be guided in the longitudinal direction L of the hollow profile 1 and in the direction of side walls 13.1 and 13.2.

Figure 3:
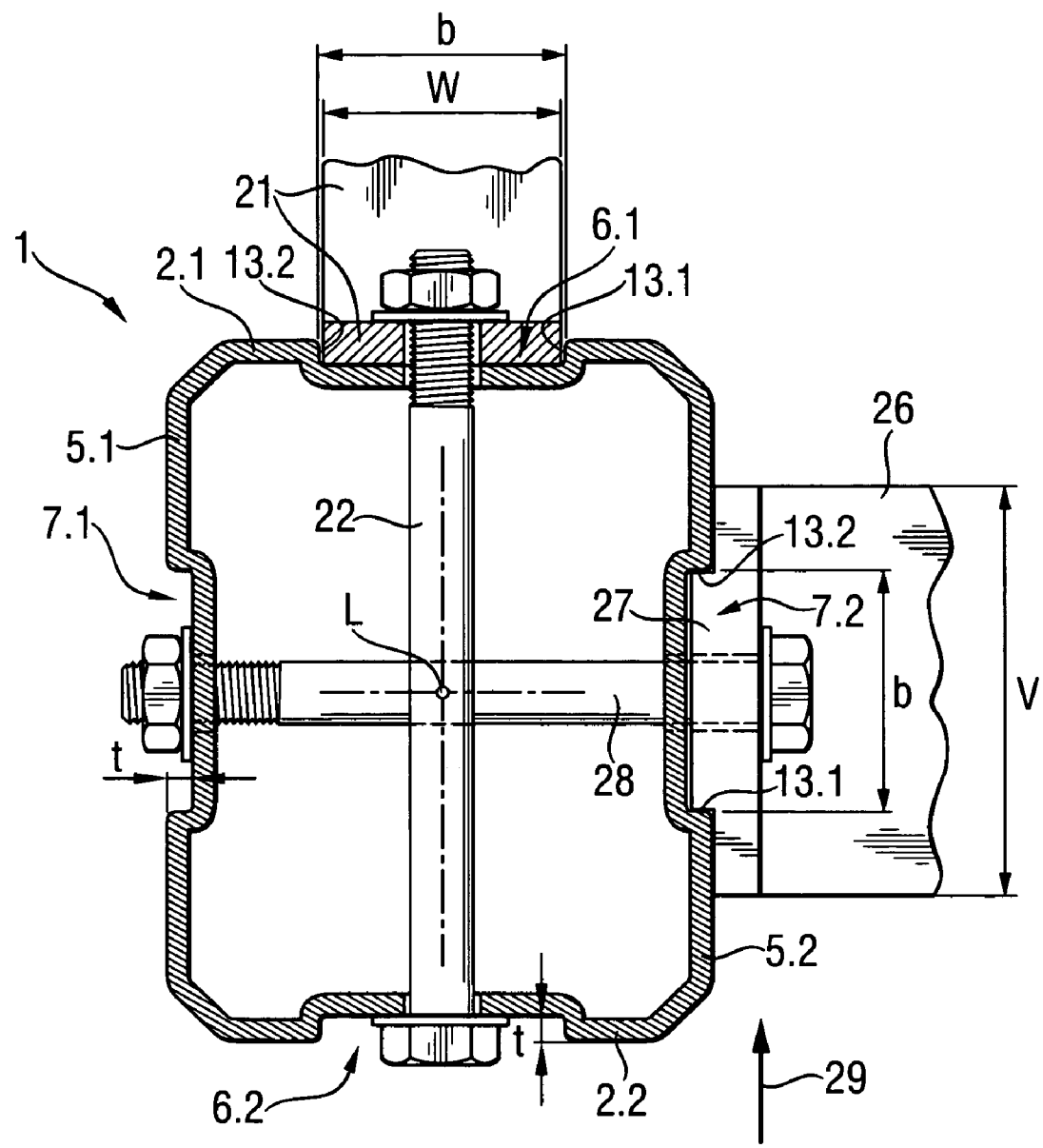
FIG. 3 a cross-sectional view of the inventive hollow profile with mounted thereon connection parts.

A cross-sectional view of the hollow profile 1 shown in FIG. 1, together with respective connection parts received in respective grooves 6.1, 6.2, 7.1, and 7.2, is shown in FIG. 3. In the groove 6.1 in the side wall 2.1, there is arranged a first connection part which is formed as an angle 21. The width W of the angle 21 is minimally smaller than the width b of the groove 6.1. The angle 21 is guided along the side wall 2.1 parallel to the plane of the side wall 2.1 along the groove side walls 13.1 and 13.2. The angle 21 is secured to the hollow profile 1 with a head bolt 22.

A second connection part, an angle 26, is arranged in the groove 7.2 in the side wall 5.2. The angle 26 has a width V which is greater than the width b of the groove 7.2. A leg 27 of the angle 27, which provides for mounting of the angle 26 on the hollow profile 1, has a shape complementary to the shape of the groove 7.2. The angle 26 is secured to the hollow profile 1 with a head bolt 28. Because the groove 7.2 has, as other grooves of the hollow profile 1, its side walls extending substantially perpendicular to the bottom, the leg 27 of the angle 26 contacts the side walls of the groove 7.2 along its entire surface. With a sidewise loading of the angle 26, e.g., in direction of arrow 29, there are no any essential force components that could lift the angle 26 off the groove 7.2. Moreover, due to the flat contact of the angle 26 with side walls 13.1 and 13.2 of the groove 7.2 or of the angle 21 with the side walls 13.1, 13.2 of the groove 6.1, a respective side wall can absorb a high side force component.

Figure 4A:
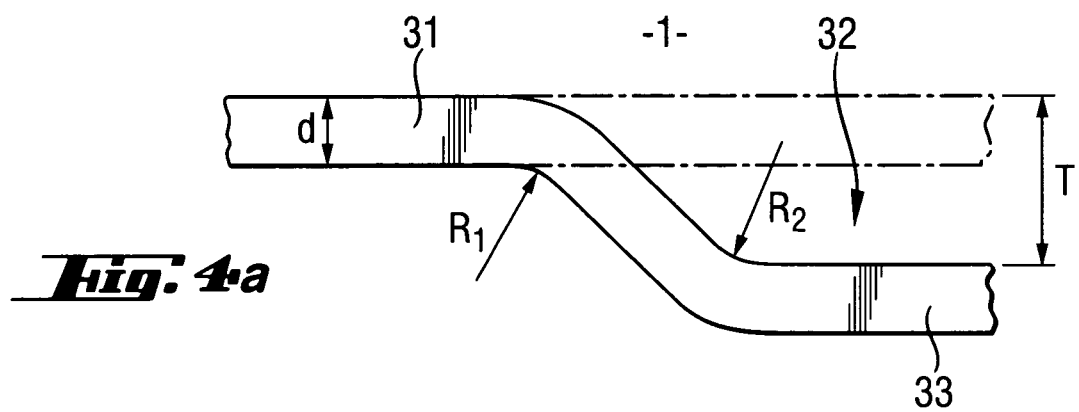
FIG. 4a–4c steps illustrating formation of a groove according to the present invention.
Figure 4B:
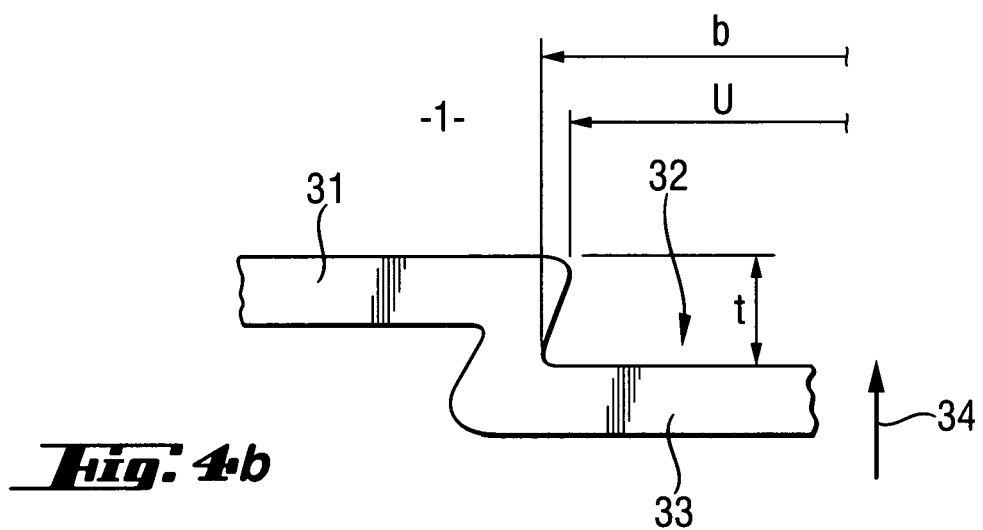
Figure 4C:
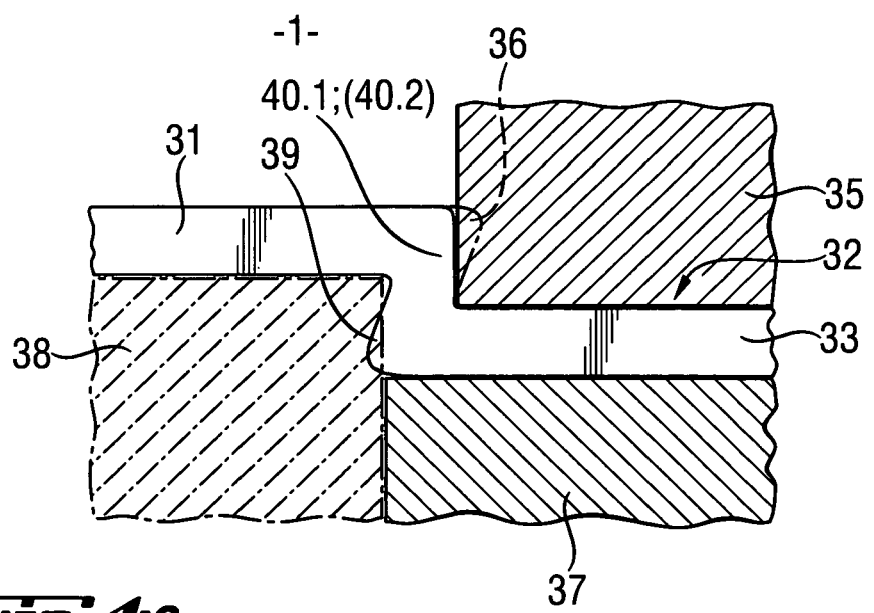

FIGS. 4a–4c show the method of forming a groove in the hollow profile 1. Below, a rolling process of forming a groove of the hollow profile will be discussed. First, in a flat material 31, e.g., sheet steel, with a roll (not shown), a groove 32 having a depth T is formed. The depth T is larger than the predetermined end depth t which the finished groove 32 should have. The inner bending radii $R_1$ and $R_2$ approximately correspond to the thickness d of the flat material 31.

Then, a groove bottom 33 is pressed in a direction apposite the direction of forming the groove, e.g., in the direction shown with arrow 34, until the groove 32 has a desired end depth t. With such a process, upon having been formed, the groove 32 has a dovetail cross-section. The inner with U of the groove 32 during this process is smaller than the width d that the groove 32 should have at the end of the manufacturing process.

With a first sizing roll 35, the projecting material 36 is pressed back, which causes flow of material with resulting compacting of the material. Subsequently or during pressing back of the projecting material 36, the groove bottom 33 is straightened with a dressing roll 37. In addition, a second sizing roll 38 can be used for pressing back projecting material 39 in a sidewise direction, whereby, in this region also the material is compacted and the material hardness increases.

The finished groove 32, which is formed according to the inventive method, is provided with even or flat sections which occupy a large portion of respective side walls 40.1, 40.2 of the groove 32 and which extend substantially perpendicular to the groove bottom 33.

In summary, there is provided according to the invention, a hollow profile formed of a flat material and having, despite formation of grooves, high static characteristics. Despite a small depth of the grooves, an adequate longitudinal and lateral guidance of connection parts, which are to be mounted on the profile, in the grooves is insured. The profile can be economically produced and has a small weight.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hollow profile (1) for positioning and guiding a connection part (26) of an assembly system and formed of a flat material (31); the hollow profile (1) comprising a plurality of side walls (2.1, 2.2, 5.1, 5.2); at least one groove (6.1, 6.2, 7.1, 7.2) provided on an outer side of at least one of the plurality of walls (2.1, 2.2, 5.1, 5.2) and having a cross-section corresponding to the shape of the connection part for longitudinally and laterally guiding same, the at least one groove having a bottom (8.1, 8.2, 9.1, 9.2) spaced from the outer side of the at least one of the plurality of walls by a depth (t) that amounts to from 0.5 to 2 times of a thickness of the flat material (31), two opposite, substantially flat side walls (13.1, 13.2, 40.1, 40.2) extending substantially perpendicular to the bottom (8.1, 8.2, 9.1, 9.2) and having an even section (h) extending over a substantial portion of the groove depth (5), and at least one mounting opening 11.1, 11.2, 12.1, 12.2) formed in the bottom (8.1, 8.2, 9.1, 9.2) of the at least one groove and through which a fastening element for securing the connection element to the hollow profile is extendable.

2. A hollow profile according to claim 1, wherein the depth (t) of the at least one groove (6.1, 6.2, 7.1, 7.2, 32) amounts to less than 1.5 times of the material thickness (d) of the flat material (31).

3. A hollow profile according to claim 1, wherein each of the plurality of side walls (2.1, 2.2, 5.1, 5.2) has at least one groove provided thereon.

4. A hollow profile according to claim 3, wherein the grooves, which are provided on the plurality of side walls, have a substantially same shape.

5. A hollow profile according to claim 1, wherein the flat material (31) is sheet steel.

6. A hollow profile according to claim 1, wherein the portion of the groove depths the even section (h) of a flat side wall (13.1, 13.2; 9.1, 9.2) extends over amounts to about 70% of the groove depth (t).

7. An assembly system, comprising at least one connection part (26); a hollow profile (1) for positioning and guiding the at least one connection part; and means (28) for securing the at least one connection part to the hollow profile, wherein the hollow profile (1) is formed of a flat material (31) and has a plurality of side walls (2.1, 2.2, 5.1, 5.2), at least one groove (6.1, 6.2, 7.1, 7.2) provided on an outer side of at least one of the plurality of walls (2.1, 2.2, 5.1, 5.2) and having a cross-section corresponding to the shape of the connection part for longitudinally and laterally guiding same, the at least one groove having a bottom (8.1, 8.2, 9.1, 9.2) spaced from the outer side of the at least one of the plurality of walls by a depth (t) that amounts to from 0.5 to 2 times of a thickness of the flat material (31), two opposite, substantially flat side walls (13.1, 13.2, 40.1, 40.2) extending substantially perpendicular to the bottom (8.1, 8.2, 9.1, 9.2) and having an even section (h) extending over a substantial portion of the groove depth (5), and at least one mounting opening 11.1, 11.2, 12.1, 12.2) formed in the bottom (8.1, 8.2, 9.1, 9.2) of the at least one groove through which the securing means (28) extends.

\* \* \* \* \*